United States Patent
Haensgen et al.

(10) Patent No.: US 10,154,006 B2
(45) Date of Patent: Dec. 11, 2018

(54) SYSTEMS, METHODS AND APPARATUS FOR SUPPORTING MULTIPLE NETWORK ADDRESSING MODES

(71) Applicant: ROCKWELL AUTOMATION TECHNOLOGIES, INC., Mayfield Heights, OH (US)

(72) Inventors: Steven T Haensgen, Mukwonago, WI (US); John P Caspers, Racine, WI (US); Yutao Wang, Brookfield, WI (US); Jeffrey A Kilburn, Hartland, WI (US); Darryl E Whitley, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 116 days.

(21) Appl. No.: 15/217,368

(22) Filed: Jul. 22, 2016

(65) Prior Publication Data
US 2018/0026941 A1 Jan. 25, 2018

(51) Int. Cl.
*G06F 15/16* (2006.01)
*H04L 29/12* (2006.01)
*H04W 4/02* (2018.01)

(52) U.S. Cl.
CPC ...... *H04L 61/2535* (2013.01); *H04L 61/2038* (2013.01); *H04L 61/609* (2013.01); *H04W 4/025* (2013.01); *H04L 61/6027* (2013.01)

(58) Field of Classification Search
CPC ... H04L 1/0061; H04L 1/1812; H04L 1/1825; H04L 2001/0093; H04L 41/0893;
(Continued)

(56) References Cited

U.S. PATENT DOCUMENTS

| 4,095,862 A | 6/1978 | Hatch |
| 4,252,396 A | 2/1981 | Wilson |

(Continued)

FOREIGN PATENT DOCUMENTS

| CN | 2648674 Y | 10/2004 |
| EP | 1967929 A2 | 9/2008 |

(Continued)

OTHER PUBLICATIONS

Siemens, Simatic Net, AS-Interface—Introduction and Basics Manual, Release Apr. 2006, 62 pages.
(Continued)

*Primary Examiner* — Benjamin M Thieu
(74) *Attorney, Agent, or Firm* — Quarles & Brady LLP

(57) ABSTRACT

Systems, methods and apparatus for multiple network addressing modes are disclosed. The method includes selecting one of an automap full mode, an automap-by-type full mode, an automap light mode, an automap-by-type light mode and a manual node commissioning mode for determining and assigning the node addresses for the network devices, determining and assigning the node addresses for the network devices based on the automap full mode, determining and assigning the node addresses for the network devices based on the automap-by-type full mode, determining and assigning the node addresses for newly added network devices to an existing network based on the automap light mode, determining and assigning the node addresses for the newly added network devices to the existing network based on the automap-by-type light mode, and determining and assigning the node addresses for the network devices based on the manual node commissioning mode.

20 Claims, 9 Drawing Sheets

(58) Field of Classification Search
CPC ............. H04L 43/0882; H04L 61/2514; H04L 63/0227; H04L 63/1425; H04L 12/2856; H04L 29/12292; H04L 41/12; H04L 45/745; H04L 49/15; H04L 61/2007; H04L 61/203

See application file for complete search history.

(56) References Cited

U.S. PATENT DOCUMENTS

| | | | |
|---|---|---|---|
| 4,359,257 | A | 11/1982 | Lopinski et al. |
| 4,641,904 | A | 2/1987 | Kosugi et al. |
| 4,773,876 | A | 9/1988 | Nakamura et al. |
| 5,059,137 | A | 10/1991 | Dale et al. |
| 5,242,313 | A | 9/1993 | Logerot et al. |
| 5,242,314 | A | 9/1993 | Di Giulio et al. |
| 6,074,238 | A | 6/2000 | DeRoss et al. |
| 6,232,557 | B1 | 5/2001 | Lounsbury et al. |
| 6,394,833 | B1 | 5/2002 | Bulmer et al. |
| 6,400,103 | B1 | 6/2002 | Adamson |
| 6,425,770 | B1 | 7/2002 | Lostoski et al. |
| 6,442,144 | B1 | 8/2002 | Hansen et al. |
| 6,732,202 | B1 | 5/2004 | Ying |
| 6,935,885 | B2 | 8/2005 | Scherer et al. |
| 7,080,150 | B1 | 7/2006 | Wehrle et al. |
| 7,112,073 | B2 | 9/2006 | Morlok |
| 7,228,363 | B1 | 6/2007 | Wehrle et al. |
| 7,313,607 | B1* | 12/2007 | Rosenberg .......... H04L 12/5601 709/220 |
| 7,412,530 | B1 | 8/2008 | Wehrle et al. |
| 7,483,396 | B2 | 1/2009 | Steindl |
| 7,721,079 | B2 | 5/2010 | Wehrle et al. |
| 8,433,827 | B2 | 4/2013 | Biehler |
| 9,813,290 | B2 | 11/2017 | Saltsidis |
| 9,876,674 | B1 | 1/2018 | Murray et al. |
| 2002/0184573 | A1 | 12/2002 | Rousseau et al. |
| 2004/0158713 | A1 | 8/2004 | Aneweer et al. |
| 2005/0021738 | A1* | 1/2005 | Goeller ............. H04L 29/12009 709/224 |
| 2005/0024026 | A1 | 2/2005 | Hung et al. |
| 2005/0243739 | A1 | 11/2005 | Anderson et al. |
| 2005/0262218 | A1* | 11/2005 | Cox ................... H04L 61/2015 709/217 |
| 2008/0192650 | A1* | 8/2008 | Kolhi ..................... H04L 41/00 370/254 |
| 2008/0281947 | A1 | 11/2008 | Kumar |
| 2009/0198385 | A1 | 8/2009 | Oe et al. |
| 2009/0205022 | A1 | 8/2009 | Sanchez et al. |
| 2010/0030345 | A1 | 2/2010 | Cole et al. |
| 2010/0186229 | A1 | 7/2010 | Enomoto et al. |
| 2010/0205271 | A1 | 8/2010 | Callaghan |
| 2010/0205281 | A1 | 8/2010 | Porter et al. |
| 2011/0222200 | A1 | 9/2011 | Fuller et al. |
| 2012/0066356 | A1 | 3/2012 | Nguyen et al. |
| 2012/0253540 | A1 | 10/2012 | Coyne et al. |
| 2012/0258726 | A1 | 10/2012 | Bansal et al. |
| 2013/0073760 | A1 | 3/2013 | Wiesgickl |
| 2013/0275566 | A1 | 10/2013 | Huth et al. |
| 2013/0288640 | A1* | 10/2013 | Bonner ................. H04L 63/102 455/406 |
| 2014/0258455 | A1* | 9/2014 | Julicher .................. H04L 67/18 709/217 |
| 2014/0280881 | A1* | 9/2014 | Szamonek ............ H04W 64/00 709/224 |
| 2015/0117244 | A1 | 4/2015 | Williamson |
| 2015/0201101 | A1 | 7/2015 | Kaminushi |
| 2015/0256389 | A1 | 9/2015 | Ruess et al. |
| 2015/0350229 | A1* | 12/2015 | Mitchell ............. H04L 63/1425 726/23 |
| 2016/0006628 | A1* | 1/2016 | Herring ............... H04L 41/0618 709/224 |
| 2016/0013948 | A1 | 1/2016 | Moses |
| 2016/0070282 | A1 | 3/2016 | Chapel et al. |
| 2016/0139999 | A1 | 5/2016 | Gabler et al. |
| 2016/0269373 | A1 | 9/2016 | White et al. |
| 2017/0025892 | A1 | 1/2017 | Van Ostrand et al. |
| 2017/0026441 | A1 | 1/2017 | Moudy et al. |
| 2017/0134477 | A1* | 5/2017 | Ben Dayan ......... H04L 61/2007 |
| 2017/0237556 | A9 | 8/2017 | Denning et al. |
| 2017/0272452 | A1 | 9/2017 | Kraemer et al. |
| 2017/0303079 | A1 | 10/2017 | Ikemoto et al. |

FOREIGN PATENT DOCUMENTS

| | | |
|---|---|---|
| EP | 1983616 A2 | 10/2008 |
| GB | 2442304 B | 10/2008 |
| KR | 1020110017576 A | 2/2011 |
| WO | 03023634 A1 | 3/2003 |
| WO | 2006089718 A2 | 8/2006 |
| WO | 2009150527 A1 | 12/2009 |

OTHER PUBLICATIONS

European Search Report; EP 17178256; dated Nov. 30, 2017; 8 pages.
Glenn Satchell, How can I configure a DHCP server to assign address based on the OS that is running; May 2010; 10 pages; retrieved from the Internet: URL:https://lists.isc.org/pipermail/dhcp-users/2010-May/011783.html, retrieved on Nov. 22, 2017.
Brian Burgess; How to Assign a Static IP Address in Windows 7, 8, 10, XP, or Vista; Nov. 10, 2013; 18 pages; retrieved from the Internet: URL:https://www.howtogeek.com/howto/19249/how-to-assign-a-static-ip-address-in-xp-vista-or-windows-7/, retrieved on Nov. 22, 2017.
Anderson, et al., Automated Power Distribution System Hardware, In Energy Conversion Engineering Conference, 1989, IECEC-89, Proceedings of the 24th Intersociety, pp. 579-584, IEEE, 1989.
Matray, et al., On the Network Geography of the Internet, In INFOCOM, 2011 Proceedings IEEE, pp. 126-130, IEEE, 2011.
Moyne, et al., The Emergence of Industrial Control Networks for Manufacturing Control, Diagnostics, and Safety Data, Proceedings of the IEEE, 2007, 95(1):29-47.
European Patent Office, Extended European Search Report, EP 17177835.0, dated Jan. 2, 2018, 10 pages.
European Patent Office, Extended European Search Report, EP 17178251.9, dated Sep. 27, 2017; 8 pages.
European Patent Office, Partial European Search Report, EP 17178252.7, dated Jan. 3, 2018, 15 pages.
European Patent Office, Extended European Search Report, EP 17178252.7, dated Mar. 27, 2018; 18 pages.
European Patent Office, Extended European Search Report, EP 17178254.3, dated Oct. 5, 2017, 8 pages.
European Patent Office, Extended European Search Report; EP 17178258.4, dated Dec. 20, 2017, 9 pages.

* cited by examiner

SYSTEMS, METHODS AND APPARATUS FOR SUPPORTING MULTIPLE NETWORK ADDRESSING MODES

BACKGROUND

The subject matter disclosed within relates generally to a communication network, and particularly relates to the system, method and apparatus for supporting multiple network addressing modes to facilitate the assignment of network addresses to devices on a communication network.

A network system may be used for interconnecting devices for data exchange, often referred to as communications. The network system may include a number of devices greater than one device. Each device on the network is accessed with a network address, and the network address is unique across the address range of the network. There may be many methods to determine and assign network addresses to network devices. These methods are called addressing modes, and they may be automatic or manual.

Addressing modes may be used to assign addresses for multiple devices on a network based on the network topology, or they may be used to assign individual unique addresses to individual devices. However, technical challenges exist for providing a network system that offers the user a multitude of addressing mode options such as automatic addressing modes for addressing all devices on a network automatically based on network topology, automatic modes for addressing one or more newly added devices to an existing network based on next available address, automatic addressing modes for addressing devices on a network automatically by device type, and manual addressing modes that allow the user to individually assign addresses to individual devices either by sending addressing messages over the network or by physically setting device addresses via address switches or some other local addressing mechanism on a device. Providing this multitude of addressing modes aids in supporting the needs of the user throughout the life cycle of the network system.

BRIEF SUMMARY OF THE INVENTION

The above problems can be solved by providing a method, a network apparatus and a system that support multiple network addressing modes.

In one aspect, the present invention provides a method of determining and assigning node addresses for network devices based on selecting and using one of multiple network addressing modes. The method may include selecting one of an automap full mode, an automap-by-type full mode, an automap light mode, an automap-by-type light mode and a manual node commissioning mode for determining and assigning the node addresses for the network devices.

The method may include, in response to selecting the automap full mode, determining and assigning the node addresses for the network devices according to the relative geographical locations of the network devices in a network, where the node addresses may follow a network address sequence, and may be determined and assigned automatically. The method may also include, in response to selecting the automap-by-type full mode, determining and assigning the node addresses for the network devices according to the relative geographical locations of the network devices in the network and their device type, where all nodes of a given device type follow a network address sequence within the appropriate device type specific address ranges, and may be determined and assigned automatically.

The method may also include, in response to selecting the automap light mode, determining and assigning the node addresses for newly added network devices to an existing network according to geographical locations of the added network devices in the network, where the added network devices may be addressed to follow the network address sequence starting with a next available address in an original network address geography. The method may also include, in response to selecting the automap-by-type light mode, determining and assigning the node addresses for the newly added network devices to the existing network according to the geographical locations of the added network devices in the network and their device type where the added network devices may be addressed to follow the network address sequence starting with the next available address within the appropriate device type specific address ranges in the original network address geography.

The method may further include, in response to selecting the manual node commissioning mode, determining and assigning the node addresses for the network devices individually, either by sending addressing messages via the network, or by physically setting device addresses via address switches or some other local addressing mechanism located on the device.

In another aspect, the present invention provides a network apparatus that may include a processor and non-transitory computer readable medium storing processing instructions for determining and assigning node addresses for network devices based on selecting and using one of multiple network addressing modes, where the processing instructions, when executed by the processor, may cause the processor to select one of an automap full mode, an automap-by-type full mode, an automap light mode, an automap-by-type light mode and a manual node commissioning mode for determining and assigning the node addresses for the network devices.

The processing instructions, when executed by the processor, may cause the processor to, in response to selecting the automap full mode, determine and assign the node addresses for the network devices based on the automap full mode according to relative geographical locations of the network devices in a network where the node addresses may follow a network address sequence, and may be assigned automatically. The processing instructions, when executed by the processor, may cause the processor to, in response to selecting the automap-by-type full mode, determine and assign the node addresses for the network devices based on the automap-by-type full mode according to the relative geographical locations of the network devices in the network and their device type, where the node addresses may follow the network address sequence within the appropriate device type specific address ranges, and may be determined and assigned automatically.

The processing instructions, when executed by the processor, may also cause the processor to, in response to selecting the automap light mode, determine and assign the node addresses for newly added network devices to an existing network according to geographical locations of the newly added network devices in the network, where the added network devices may be addressed to follow a network address sequence starting with a next available address in an original network address geography. The processing instructions, when executed by the processor, may cause the processor to, in response to selecting the automap-by-type light mode, determine and assign the node addresses for the newly added network devices to the existing network according to the geographical locations of the added network devices in the network and their device type, where the added network devices may be addressed to follow the network address sequence starting with the next available address within the appropriate device type specific address ranges in the original network address geography.

The processing instructions, when executed by the processor, may further cause the processor to, in response to selecting the manual node commissioning mode, determine and assign the node addresses for the network devices uniquely and individually.

In some embodiments, the network apparatus is not addressed in the network. The unique node addresses can have an upper limit, wherein the upper limit is set based on the network.

In some embodiments, the unique node addresses are determined and assigned according to criteria determined by a system designer, wherein each unique node address is determined by a system designer before it is connected to the network.

In yet another aspect, the present invention provides a system that may include a network having network devices, a set of network devices connected to the network and a network apparatus having a processor and non-transitory computer readable medium storing processing instructions for determining and assigning node addresses for the network devices in the network, based on selecting and using one of multiple network addressing modes, where the processing instructions may include a mode selector to select one of an automap full mode, an automap-by-type full mode, an automap light mode, an automap-by-type light mode and a manual node commissioning mode for determining the node address for the network devices.

The processing instructions may include an automap full mode address determiner, invoked in response to selecting the automap full mode, to determine the node addresses for the network devices according to relative geographical locations of the network devices in a network, where the node addresses may follow a network address sequence.

The processing instructions may include an automap-by-type full mode address determiner, invoked in response to selecting the automap-by-type full mode, to determine the node addresses for the network devices according to the relative geographical locations of the network devices in the network and their device type, where the node addresses may follow the network address sequence within the appropriate device type specific address ranges.

The processing instructions may include an automap light mode address determiner, invoked in response to selecting the automap light mode, to determine the node addresses for a set of newly added network devices to an existing network according to geographical locations of the added network devices in the network, where the added network devices may be addressed to follow a network address sequence starting with a next available address in the original network address geography.

The processing instructions may include an automap-by-type light mode address determiner, invoked in response to selecting the automap-by-type light mode, to determine the node addresses for the set of newly added network devices to the existing network according to the geographical locations of the added network devices in the network and their device type where the added network devices may be addressed to follow the network address sequence starting with the next available address within the appropriate device type specific address ranges in the original network address geography.

The processing instructions may also include a manual node commissioning mode address determiner, invoked in response to selecting the manual node commissioning mode, to determine the node address network devices uniquely and individually.

In some embodiments, each unique node address has an upper limit, wherein the upper limit is set based on the network.

In some embodiments, the node addresses are determined according to a type of network device or a function of a device within a complex machine, wherein each unique node address is set by a system designer before it is connected to the network.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1:
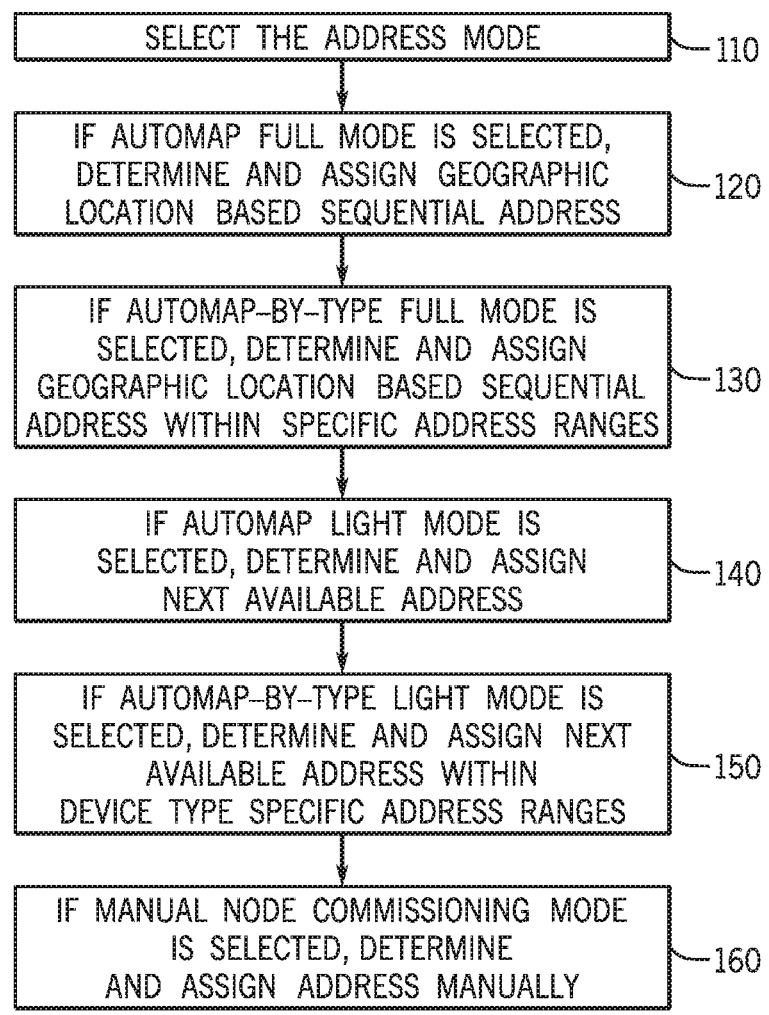
FIG. 1 is a flowchart that illustrates the logic for choosing an addressing mode for determining and assigning node addresses for network devices from one of multiple network addressing modes.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 is a flowchart that illustrates the logic for selecting an address mode for determining and assigning node addresses for network devices based on the support of multiple network addressing modes 100. As shown in FIG. 1, the logic 100 includes selecting one of multiple address modes 110. After an address mode has been selected, one of the address modes is used for determining and assigning device addresses for devices on the network.

If automap full mode is selected (120 in FIG. 1), a geographic location based sequential address method is used for determining and assigning addresses to the network devices. If automap-by-type full mode is selected (130 in FIG. 1), a geographic location based sequential address within a device type specific address range method is used for determining and assigning addresses to the network devices. If automap light mode is selected (140 in FIG. 1), a next available address method is used for determining and assigning addresses to newly added network devices. If automap-by-type light mode is selected (150 in FIG. 1), a next available address within a device type specific address range method is used for determining and assigning addresses to newly added network devices. If manual node commissioning mode is selected (160 in FIG. 1), a manual method is used for determining and assigning addresses to network devices.

A network, by definition, has multiple devices, and the multiple devices may be connected with each other. For example, a network may have devices such as relays, motor starters and pushbuttons. A network may also have data processing devices such as computers. A network may have both power supply devices and data processing devices simultaneously. Each device on the network may have a node address that uniquely identifies the network device on the network for the purposes of accessing the device via the network communications protocol.

Each device in a network may have a device key associated with it that may include one or more identifying attributes of the device. The device key may be used for identifying the device type and relative geographic location on the network of the device. The device key may also be used for determining whether a device is compatible for the network when a device of the network is replaced or is added. A device key may include a device vendor, a device type, a device product code, a device series, relative geographic location on the network of the device, or any combination thereof. For a linear network, a geographic location of the device is a relative sequential geographic position of the device on the network cable. The device product code may be a catalog number, and the device series may also be a device revision.

For some network systems, it is advantageous to assign device addresses so that the device addresses reflect the nodal geography of the network. This may be particularly useful in linear networks where sequential node addresses can be used to reflect the linear device geography. For this type of system, the automap full addressing mode may be used to determine and assign sequential addresses for all network devices. It is easy to see how it may be difficult to address each node of a network individually. For example, for a linear network, setting device addresses individually on the linear bus may be cumbersome and mistake prone. As such, initiating the automap full mode to determine and assign the addresses for network devices automatically during the commissioning process eliminates the need to set network address individually for each device.

For other network systems, it may be advantageous to assign device addresses so that the devices of like type are addressed within an address range dedicated to that device type. For example, it may be advantageous to have all motor starters on a network to be addressed starting at address 10, all relays on a network to be addressed starting at address 20, and all pushbuttons on a network to be addressed starting at address 40. For this type of system, the automap-by-type full addressing mode may be used to determine and assign sequential addresses within device type address ranges for all network devices. It is easy to see how accomplishing type-specific addressing may be difficult if each network node must be addressed individually which may be cumbersome and mistake prone. As such, initiating the automap-by-type full mode to determine and assign the addresses for network devices automatically during the commissioning process eliminates the need to set network address individually for each device.

However, using the automatic network address modes may not be flexible enough to meet addressing requirements of the network, especially during the maintenance portion of a network system's life cycle. For example, during the life cycle of the network, new network devices may need to be added in the middle of a linear network after sequential network addresses are automatically assigned to network devices. Thus, in order for network devices to keep sequential addresses in the network, all network devices in the linear network that are on the right side of the added device, would need to be re-addressed after the new device is added.

Such re-addressing may be problematic. For example, when the existing addresses for network devices are referenced by other network applications or programs, the changes to the network addresses due to the re-addressing may require updates or changes to other network applications or programs. The other network applications may need to be changed to reference the new network addresses after the re-addressing. This change process may not be easy particularly when the network applications are in use.

Thus, a network system and apparatus that can support multiple addressing options may be needed. For a linear network, the network devices may be automatically addressed sequentially during the commissioning process. After that, when new devices are added in the middle of the original network devices, rather than re-addressing the network devices to the right of the added devices to maintain sequential addressing for the entire network, the "next available unused sequential addresses" may be determined and assigned to the newly added devices. As such, initiating the automap light mode to determine and assign the addresses for newly added network devices automatically during a maintenance operation eliminates the problems associated with automatic sequential addressing during the maintenance phase of a network system's life cycle, but it still offers the advantages associated with an automatic addressing mode.

Likewise, for a network that has been addressed so that devices of like type are addressed in device type specific address ranges, the addition of new devices may be needed during the maintenance phase of the network system. Rather than re-addressing the network devices within the various device type address ranges, the "next available unused sequential addresses within the applicable device type address range" may be determined and assigned to the newly added devices. As such, initiating the automap-by-type light mode to determine and assign the addresses for newly added network devices automatically during a maintenance operation eliminates the problems associated with readdressing the entire network during the maintenance phase of a network system's life cycle, but it still offers the advantages associated with an automatic addressing mode.

To select the address mode (110), one of the automap full mode, the automap-by-type full mode, the automap light mode, the automap-by-type light mode and the manual node commissioning mode may be selected for determining and assigning the node addresses for the network devices. A network address of a network device must be unique for the network, however, there may be multiple ways to determine and assign the network address for a network device. For the linear network example above, one of the automap full mode or the automap-by-type full mode may be selected to automatically determine and assign network addresses for all devices in the network during network commissioning.

After the network is commissioned, one or more new devices may be added in the middle of the existing network devices. In order not to change addresses of the existing network devices, one of the automap light mode or the automap-by-type light mode may be selected to choose a next available appropriate addresses for the newly added network devices. It is noted that the advantages of using an automatic addressing mode are provided by these "light" addressing modes while eliminating the problems associated with readdressing the entire network during the maintenance phase.

When a unique and individualized network address is desired to be assigned for a device of the network, a manual node commissioning mode may be selected. For the manual node commissioning mode, a unique and individualized network address for each node to be commissioned may be assigned to the network devices to be commissioned. The unique network addresses may have an upper limit and a lower limit. The upper limit may be the maximum network address, and the lower limit may be the next available address for the network. It is noted that the manual node commissioning mode may be appropriate for use in all phases of a network system. Unique addressing schemes based on unique system criteria may make the flexibility associated with manual node commissioning attractive during the original network commissioning process. For example, the system designer may want to address groups of nodes together based on the functional components of a complex machine. Also, the manual node commissioning mode affords great flexibility when nodes are added to an existing network during the maintenance phase of a network system's life cycle.

To determine and assign an automap full mode address (120) in response to selecting the automap full mode, node addresses may be determined according to relative geographical locations of the devices on the network. The node address may follow a network address sequence, and the node addresses may be determined and assigned to the network devices automatically. When a linear network is commissioned, node addresses for all devices may be determined and assigned automatically in a sequential order. For example, when a linear network has five devices, during the commissioning process, the node addresses may be determined and assigned as: 1, 2, 3, 4 and 5 for those five network devices. Other network address schemes that are associated with the sequential order of the devices may also be used. For example, addresses 2, 4, 6, 8 and 10 may be determined and assigned to the network devices automatically during the commissioning process for this linear network. Such determination and assignment may leave room for future network expansion while maintaining sequential addresses on the network.

However, when the network is not a linear network, the node address may not follow a sequential order. The node addresses may be determined or assigned according to relative geographical locations of each device on the network. For example, the node addresses may be determined or assigned according to three-dimensional coordinates of network devices on the network.

To determine and assign an automap-by-type full address (130) in response to selecting the automap-by-type full mode, node addresses may be determined according to relative geographical locations of the devices on the network. However, each type of device on the network may have a range of node addresses, and the node addresses for the device type are determined and assigned within the device type specific address range. As such, according to the automap-by-type full address mode, the node address may still follow a network address sequence, and the node addresses may still be determined and assigned to the network devices automatically. For example, the relays may have a device type specific address range of 1-19, so the node addresses for three relays in the network may be determined and assigned node addresses: 1, 2 and 3. The starters may have a device type specific address range of 20-29, so the node address for four starters in the network may be determined and assigned node addresses: 20, 21, 22, and 23. The address are thus determined automatically according to the type of the device and the sequence of the device in the network.

To determine and assign an automap light mode address (140) in response to selecting the automap light mode, the node address may be determined and assigned according to a next available address in an original network address geography. For a linear network with five (5) devices, when a device is added between the second and the third devices, for automap full mode to keep the sequential order for the network addresses, the added device is assigned the address that is associated with number three (3), and the network addresses for third, fourth and fifth devices need to be re-addressed to associate with numbers four (4), five (5) and six (6). As such, network addresses for four devices may be changed.

However, for automap light mode, when one or more additional network devices are added to an existing network system, the next available addresses in the original network address geography are determined and assigned to the additional network devices sequentially. In the example provided, the next available address is determined to be 6, so the device added between the second and third devices would be assigned the network address six (6), and the network addresses for all other devices on the network do not need to be changed.

The automap light addressing mode also minimizes the changes to a programmable logic controller (PLC) program when a new device is added. For the linear network described above, after the network is commissioned, the network addresses for five devices are automatically determined and assigned. The PLC may establish the references to the five devices by referring their network addresses. When a new device is added between the second and the third device in the network, with the automap full address mode, the addresses for the third, fourth and fifth devices need to be changed. As such, references to the new addresses of third, fourth and fifth devices in the PLC program would need to be changed accordingly. However, when the automap light address mode is used, only the next available address associated with number six (6) is determined and assigned to the newly added device, there is no address change to other devices, thus the PLC program does not need to be changed for all existing devices. Therefore, the PLC program changes are reduced.

To determine and assign an automap-by-type light mode address (140) in response to selecting the automap-by-type light mode, the node address may also be determined and assigned according to a next available address in an original network address geography. However, each type of device on the network may have a range of acceptable node addresses, such that the node address for each device is determined and assigned based upon the device type and the next available address within the specific address range for the device type. For example, the relays may have a device type specific address range of 1-19, so the node addresses for three existing relays in the network may be determined and assigned: 1, 2 and 3. Thus, the next available address for relays is 4, and the node address for a newly added relay on the network has a node address of 4 according to the automap-by-type light address mode. Also, the starters may have a device type specific address range of 20-29, so the node address for four existing starters in the network may be determined and assigned: 20, 21, 22, and 23. Thus the next available address for starter is 24, and according to the automap-by-type light address mode, a newly added starter will have its address determined and assigned the value 24. As such, according to the automap-by-type light mode, the newly added node may be determined and assigned a node address based on the next available address in the device type specific range.

To determine and assign a manual node commissioning mode address (150), the node address for each network device may be uniquely and individually determined and assigned. For the linear network with a device being added between the second and the third devices, the network address for the added device may be determined and assigned to be any address number within an acceptable range associated with a given system, such as twenty (20). This network address is not the next sequential address available in the original network address, rather the address is unique for the newly added individual device. For the manual node commissioning addressing mode, the addresses for other existing devices do not need to be changed.

The network address may have an upper limit For example, the linear network described above may have an upper limit of sixty-three (63) as the network address. Because of this, the unique network address according to the manual node commissioning mode may not greater than sixty-three (63). The network address may also have a lower limit. When the linear network has five devices with network addresses of numbers 1, 2, 3, 4 and 5, the lower limit for the newly added device is number six (6). Otherwise, the network address for the newly added device is not unique.

Sometimes, a system designer may manually determine and assign the network address according to the manual node commissioning mode. For example, a system designer may allocate the node address twenty (20) for a fan and allocate the node address thirty (30) for a pump. Thus, the programmer for the network application, may allocate network addresses for fan and/or pump even before they are connected to the network.

A user interface may be provided for a system designer to determine and assign the unique address to an individual network device. For example, the linear network may have a network commissioning tool in addition to other network devices. The network commissioning tool may or may not be addressed in the linear network. The network commissioning tool may provide a user interface that the system designer may use to determine and assign a network address for a network device. For example, when a device is added between the second and the third devices, the system designer may determine and assign a number twenty (20) for the newly added device manually by using the user interface of the network commissioning tool.

Figure 2:
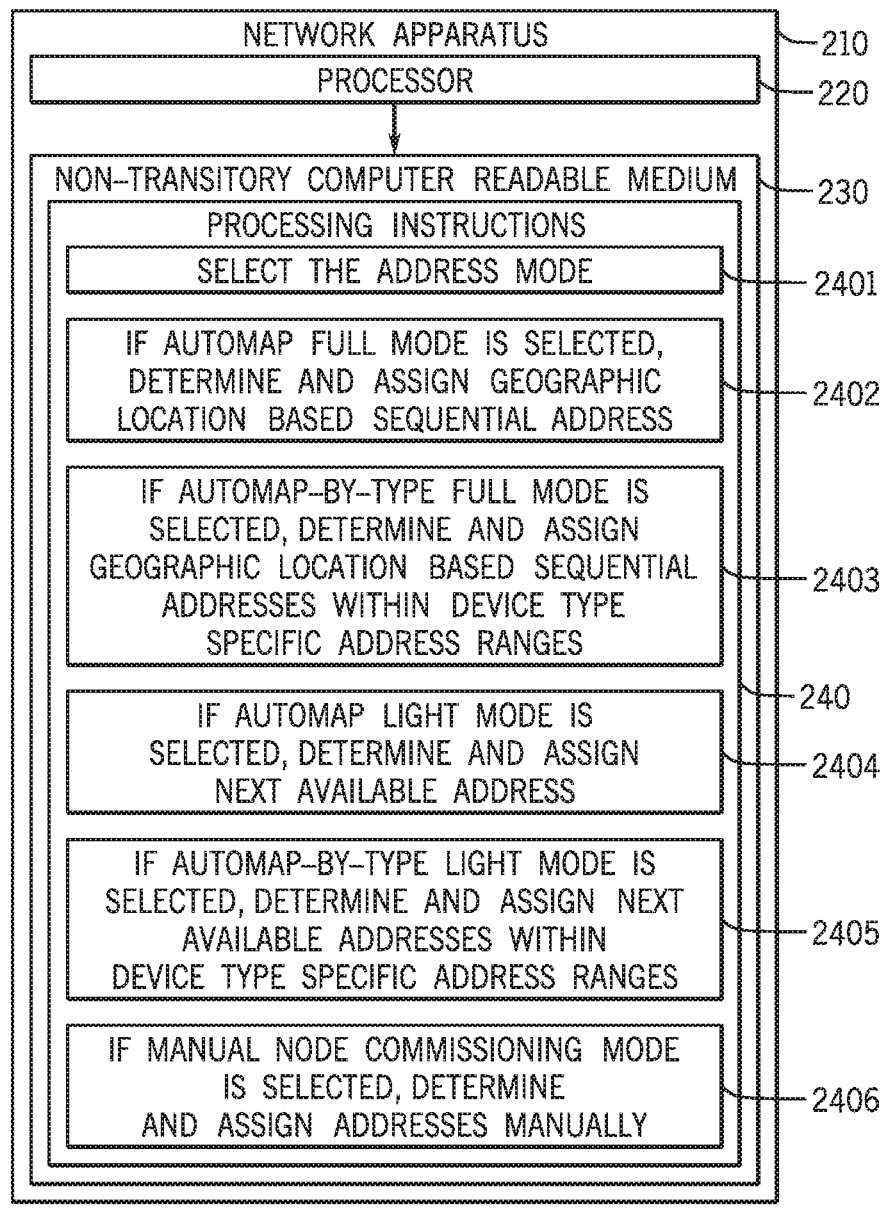
FIG. 2 illustrates a network apparatus for choosing an addressing mode for determining and assigning node addresses using one of multiple network addressing modes.

FIG. 2 illustrates a network apparatus for determining and assigning network addresses based on the selection of one of multiple network addressing modes 200. As shown in FIG. 2, the network apparatus 210 may include a processor 220 and non-transitory computer readable medium 230 storing processing instructions 240 for determining and assigning node addresses for network devices based on the selection of one of multiple network addressing modes.

The processing instructions 240, when executed by the processor 220, enables the selection of automap full mode, automap-by-type full mode, automap light mode, automap-by-type light mode and manual node commissioning mode for determining and assigning the node addresses for the network devices.

The processing instructions 240, when executed by the processor 220, may cause the processor 220, in response to selecting the automap full mode 2402, to determine and assign node addresses for the network devices according to relative geographical locations of the network devices in a network, where the node addresses may follow a network address sequence, and may be assigned automatically.

The processing instructions 240, when executed by the processor 220, may also cause the processor 220, in response to selecting the automap-by-type full mode 2403, to determine and assign node addresses for the network devices according to relative geographical locations and sequential addresses within device type specific address ranges of the network devices in a network, where the determined node addresses may be assigned automatically.

The processing instructions 240, when executed by the processor 220, may also cause the processor 220, in response to selecting the automap light mode 2404, to determine and assign the node addresses for newly added network devices to an existing network according to geographical locations of the newly added network devices in the network, where the added network devices may be addressed to follow a network address sequence starting with a next available address in an original network address geography and where the determined node addresses may be assigned automatically.

The processing instructions 240, when executed by the processor 220, may also cause the processor 220, in response to selecting the automap-by-type light mode 2405, to determine and assign the node addresses for newly added network devices to the existing network according to geographical locations of the newly added network devices in the network, where the added network devices may be addressed to follow a network address sequence starting with a next available address within device type specific address ranges in an original network address geography, and where the determined node addresses may be assigned automatically.

The processing instructions 240, when executed by the processor 220, may cause the processor 220, in response to selecting the manual node commissioning mode 2406, to determine and assign the node addresses for the network devices, where the node address for each network device may be uniquely and individually determined and assigned.

The network apparatus may or may not be addressed in the network. The network apparatus may be a control workstation or a network commissioning tool that serves the network and may determine and assign the node addresses for the network devices. The network apparatus may not be addressed in the network. Alternatively, the network apparatus may be assigned a special network address. For example, when the network addresses associated with numbers 1, 2, 3, 4 and 5 may be assigned to the five network devices in the linear network described above. The network apparatus may be assigned a special network address that is associated with number zero (0).

The network may have an upper limit for the node address. For example, the linear network described above may have an upper limit of sixty-three (63) as the node address. As such, the maximum capacity of the linear network may be 63 network devices.

For the manual node commissioning addressing mode, the unique node addresses may be determined and assigned according to a type of network device or a type of machine function, and each unique node address may be determined by a system designer before it is connected to the network. For example, the system designer may set the network address for a fan to be associated with number twenty (20), and the fan may be assigned the network address twenty (20) before the fan is connected to the network. The system designer may set the network address via a user interface provided by the central control station or the network commissioning tool.

Figure 3:
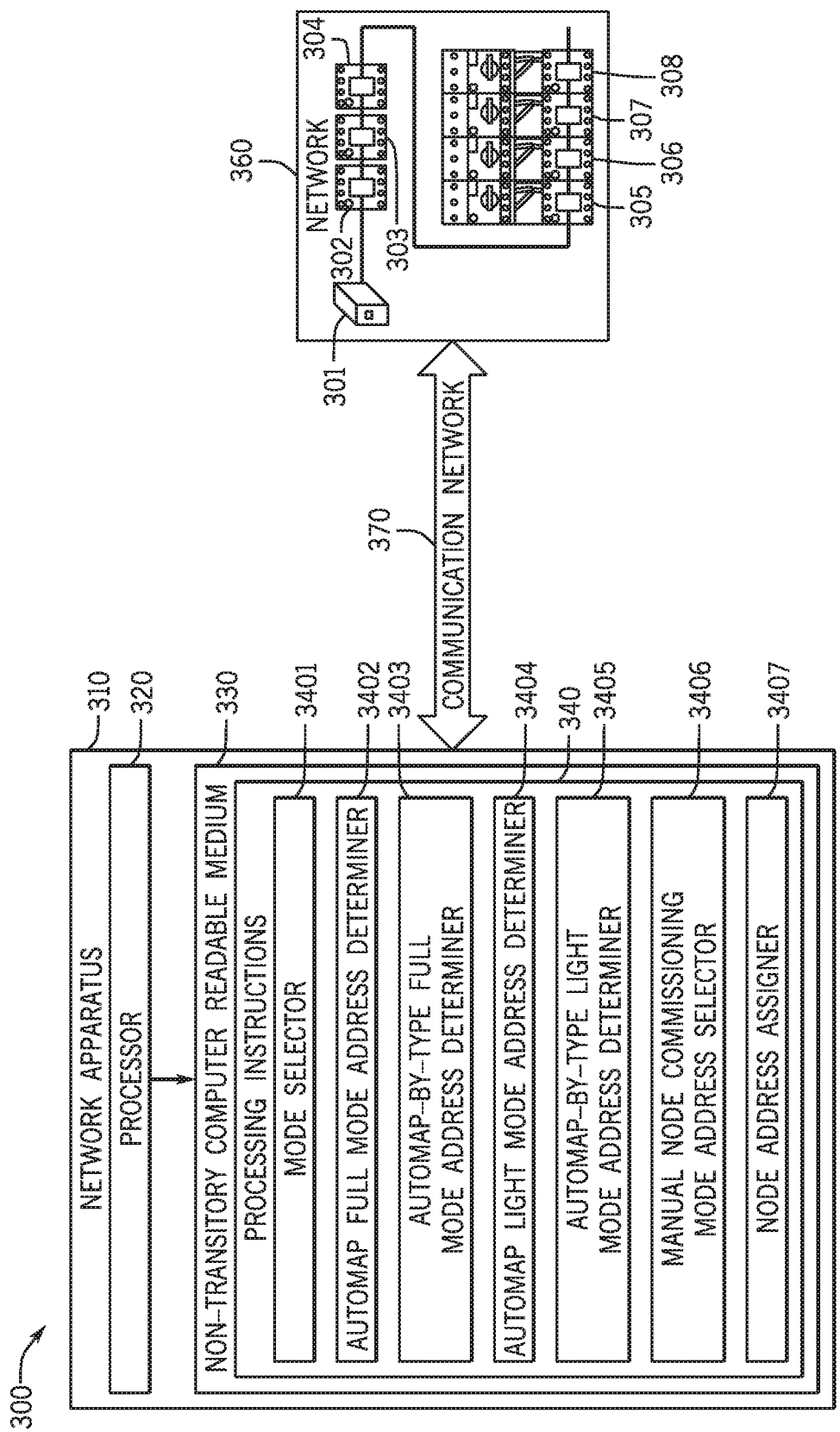
FIG. 3 illustrates a system for choosing an addressing mode that determines and assigns node addresses using one of multiple network addressing modes.

FIG. 3 illustrates a system that determines and assigns networks addresses based on the selection of one of multiple network addressing modes 300. As shown in FIG. 3, the system 300 may include a network 360 with a number of network devices: device one 301, device two 302, device three 303, device four 304, device five 305, device six 306, device seven 307 and device eight 308. A network apparatus 310 may connect with the network 360 directly, or via communication network 370 through a communication gateway or router 301. The network apparatus 310 may include a processor 320, non-transitory computer readable medium 330 storing processing instructions 340 for determining and assigning node addresses for the network devices in the network based on the selection of one of multiple network addressing modes.

The processing instructions 340 may include a mode selector 3401 that may select one of the automap full mode, the automap-by-type full mode, the automap light mode, the automap-by-type light mode and the manual node commissioning mode for determining the node address for the added network device.

The processing instructions 340 may include an automap full mode address determiner 3402 that may, in response to selecting the automap full mode, determine the node addresses for the network devices based on the relative geographical locations of the network devices in a network, where the node addresses may follow a network address sequence.

The processing instructions 340 may also include an automap-by-type full mode address determiner 3403 that may, in response to selecting the automap-by-type full mode, determine the node addresses for the network devices based on sequential addressing of like-type devices within type-specific address ranges.

The processing instructions 340 may include an automap light mode address determiner 3404 that may, in response to selecting the automap light mode, determine the node addresses for a set of newly added network devices to an existing network based on the geographical locations of the added network devices in the network, where the added network devices may be addressed to follow a network address sequence starting with a next available address in an original network address geography. The node addresses based on the automap light mode may be assigned sequentially starting with a next available unused address in the existing network 360.

The processing instructions 340 may include an automap-by-type light mode address determiner 3405 that may, in response to the automap-by-type light mode, determine the node addresses for a set of newly added network devices to an existing network based on the next available address within an appropriate device type specific address range for each added device.

The processing instructions 340 may include a manual node commissioning mode address selector 3406 that may facilitate the user selecting a unique node address for each node on the network.

The processing instructions 340 may include a node address assigner 3407 that may assign the device addresses based on one of the determined or selected node addresses for the network devices.

The network apparatus 310, which could be a standalone control workstation or a network commissioning tool may provide a user interface that may allow a system designer to input the node addresses via the user interface for network devices, when the manual node commissioning mode has been chosen by the Mode Selector 3401. The user interface may be used to enter a node address for existing network devices or for newly added devices. An entered node address may replace the network address of an existing network device. In addition, the input node address from the system designer may be the determined node addresses from one of the address determiners.

The network apparatus 310 which could be the standalone control workstation or a network commissioning tool may not be addressed in the network. Alternatively, the network apparatus 310 may be assigned a special network address. For example, the network 360 may consist of network devices of device one 301, device two 302, device three 303, device four 304, device five 305, device six 306, device seven 307 and device eight 308. Those devices may have the network addresses that are associated with numbers 1, 2, 3, 4, 5, 6, 7 and 8 respectively. The network apparatus 310 may be assigned a special network address that is associated with number 0.

Each unique node address of the network 360 may have an upper limit, and the upper limit may be set based on the network. For example, the network 360 may have an upper address limit of 63. The network address for the network device may be assigned an unique number based on the manual node commissioning addressing mode, however, this unique number may not exceed the upper limit 63. The node addresses may be determined according to a type of network device, and each unique node address may be set by a system designer before it is connected to the network 360. For example, the node address for a fan may be set to be 20, and this address may be set by a system designer via a user interface before the fan is connected to the network 360.

Figure 4:
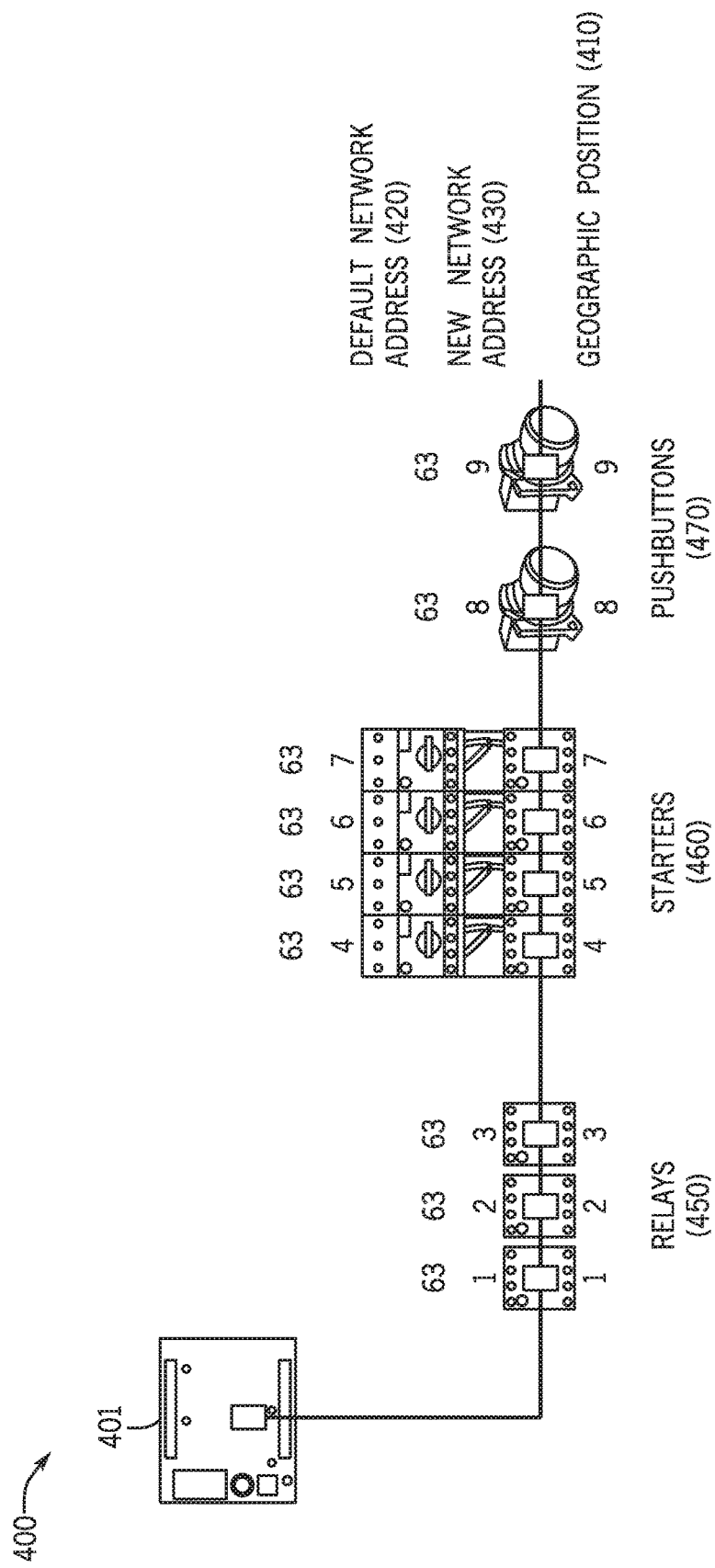
FIG. 4 illustrates an example implementation of determining and assigning network addresses for network devices based on the automap full addressing mode.

FIG. 4 illustrates an example implementation of determining and assigning network addresses for network devices based on the automap full addressing mode 400. As shown in FIG. 4, a linear network that has nine devices: 3 relays 450, 4 motor starters 460 and 2 pushbuttons 470. The devices, when placed on the network in their default state may have a default network address 63 (420).

According to the automap full addressing mode, all devices follow the sequential order based on the relative geographic locations (410) of each device. As such, in FIG. 4, the relays 450 have geographic positions 1, 2 and 3, the motor starters 460 have geographic positions 4, 5, 6, and 7, and the pushbuttons 470 have geographic positions 8 and 9. As a result of determining and assigning network addresses for devices, all devices on the linear network are assigned new network addresses (430) that follow the sequential order of 1, 2, 3, 4, 5, 6, 7, 8 and 9, matching the geographic position (410).

Figure 5:
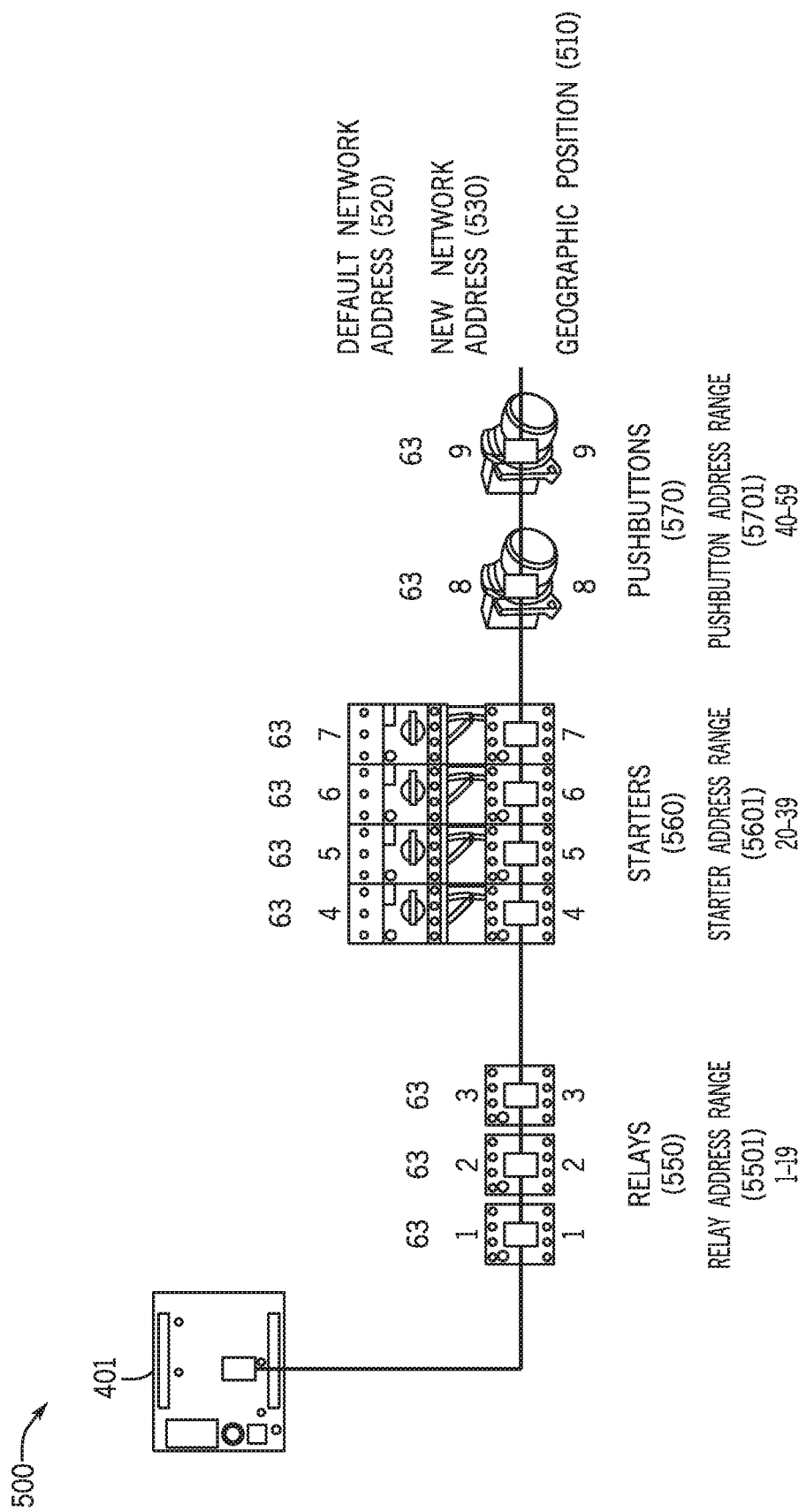
FIG. 5 illustrates an example implementation of determining and assigning network addresses for network devices based on the automap-by-type full addressing mode.

FIG. 5 illustrates an example implementation of determining and assigning network addresses for network devices based on the automap-by-type full addressing mode 500. As shown in FIG. 5, a linear network that has nine devices: 3 relays 550, 4 motor starters 560 and 2 pushbuttons 570. The devices, when placed on the network in their default state may have a default network address 63 (520).

According to the automap-by-type full addressing mode, all devices of a given device type follow a sequential order within a device type specific address range. As such, in FIG. 5, the relays 550 have a relay-specific address range (5501) with a low limit of 1 and a high limit of 19. The relays 550 have geographic positions 1, 2 and 3. The motor starters 560 have a starter-specific address range (5601) with a low limit of 20 and a high limit of 39. The motor starters have geographic positions 4, 5, 6, and 7. The node addresses may start with 20 and can be 20, 21, 22, 23. The pushbuttons 570 have a pushbutton-specific address range (5701) with a low limit of 40 and a high limit of 59. The pushbuttons have geographic positions 8 and 9. The node addresses start with 40 and can be 40 and 41. As a result of determining and assigning network addresses for devices, all devices on the linear network are assigned new network addresses (530) that follow a sequential order within their device type specific address ranges.

Figure 6:
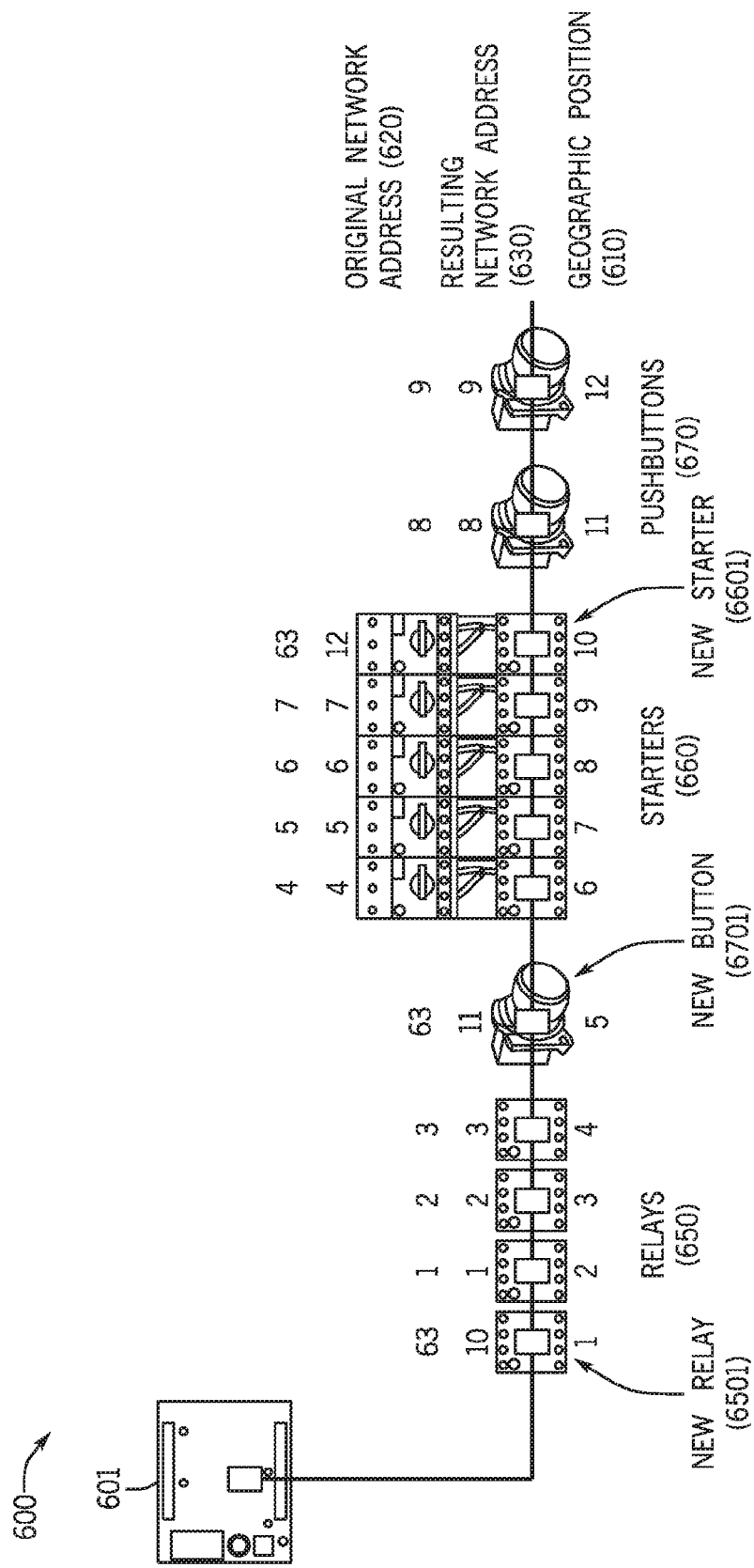
FIG. 6 illustrates an example implementation of determining and assigning network addresses for network devices based on the automap light addressing mode.

FIG. 6 illustrates an example implementation of determining and assigning network addresses for network devices based on the automap light addressing mode 600. FIG. 6 shows the same linear network as FIG. 4 with 3 new devices added to the network. The added devices are a new relay 6501, a new starter 6601 and a new pushbutton 6701. However, unlike the automap full addressing mode which the node addresses follow the sequential order, the automap light addressing mode assigns the next available network address to the newly added network devices. As such, the leftmost new relay 6501 is assigned the next available network address 10, the new pushbutton 6701 is assigned the next available network address 11 and the new starter 6601 is assigned the next available network address 12. As shown in FIG. 6, the resulting network addresses 630 for devices do not follow the sequential order. They may be out of sequence.

Figure 7:
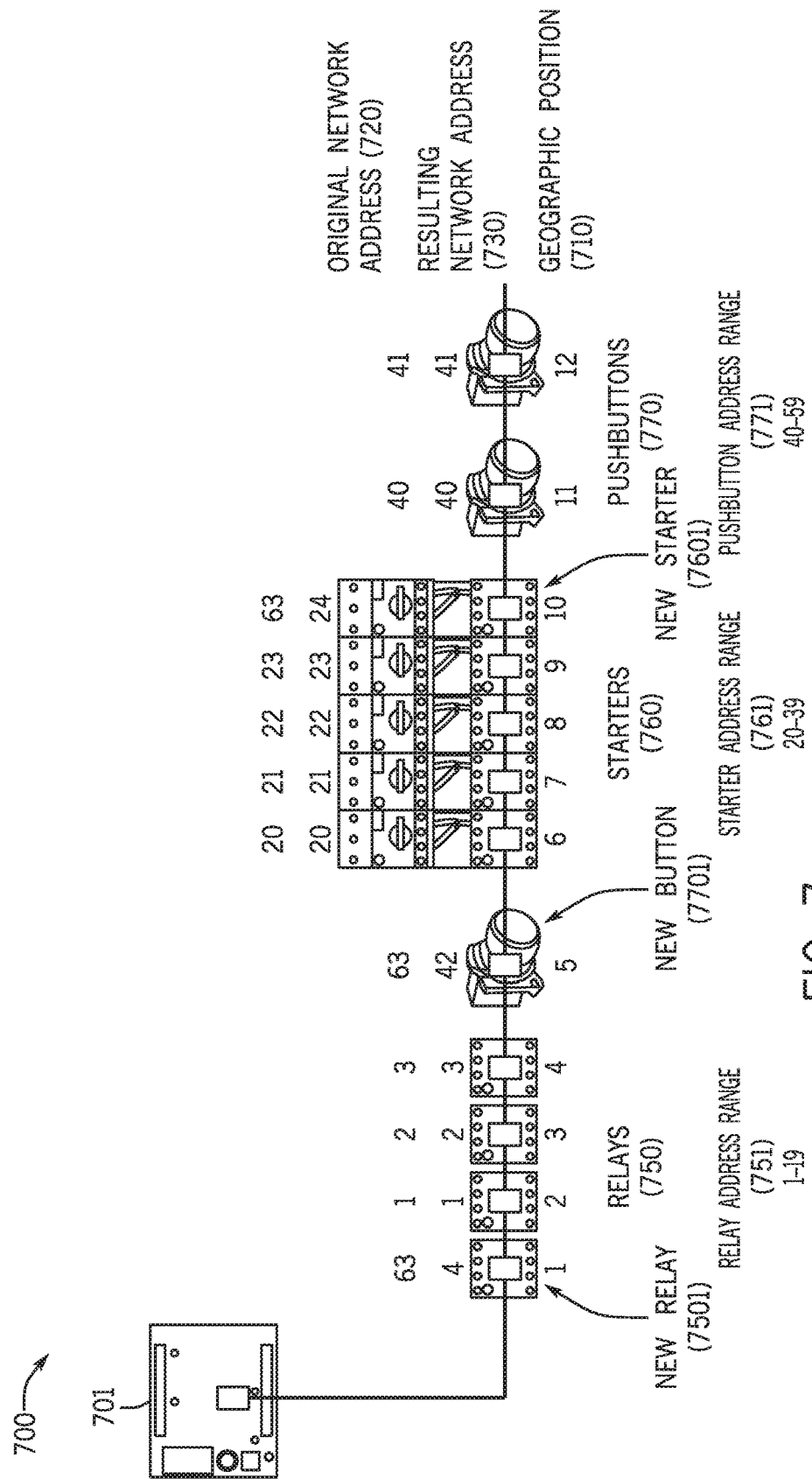
FIG. 7 illustrates an example implementation of determining and assigning network addresses for network devices based on the automap-by-type light addressing mode.

FIG. 7 illustrates an example implementation of determining and assigning network addresses for network devices based on the automap-by-type light addressing mode 700. FIG. 7 shows the same linear network as FIG. 5 with 3 new devices added to the network. The added devices are a new relay 7501, a new starter 7601 and a new pushbutton 7701. However, unlike the automap-by-type full addressing mode which the node addresses follow the sequential order, the automap light addressing mode assigns the next available network address within a device type specific address range to the newly added network devices. As such, the new relay 7501 is assigned the next available network address within the relay address range 751 which is address 4. The new pushbutton 7701 is assigned the next available network address within the pushbutton address range 771 which is address 42. The new starter 7601 is assigned the next available network address within the starter address range 761 which is address 24. As shown in FIG. 7, the resulting network addresses 730 for devices may or may not follow any sequential order within a given device type specific address range.

Figure 8:
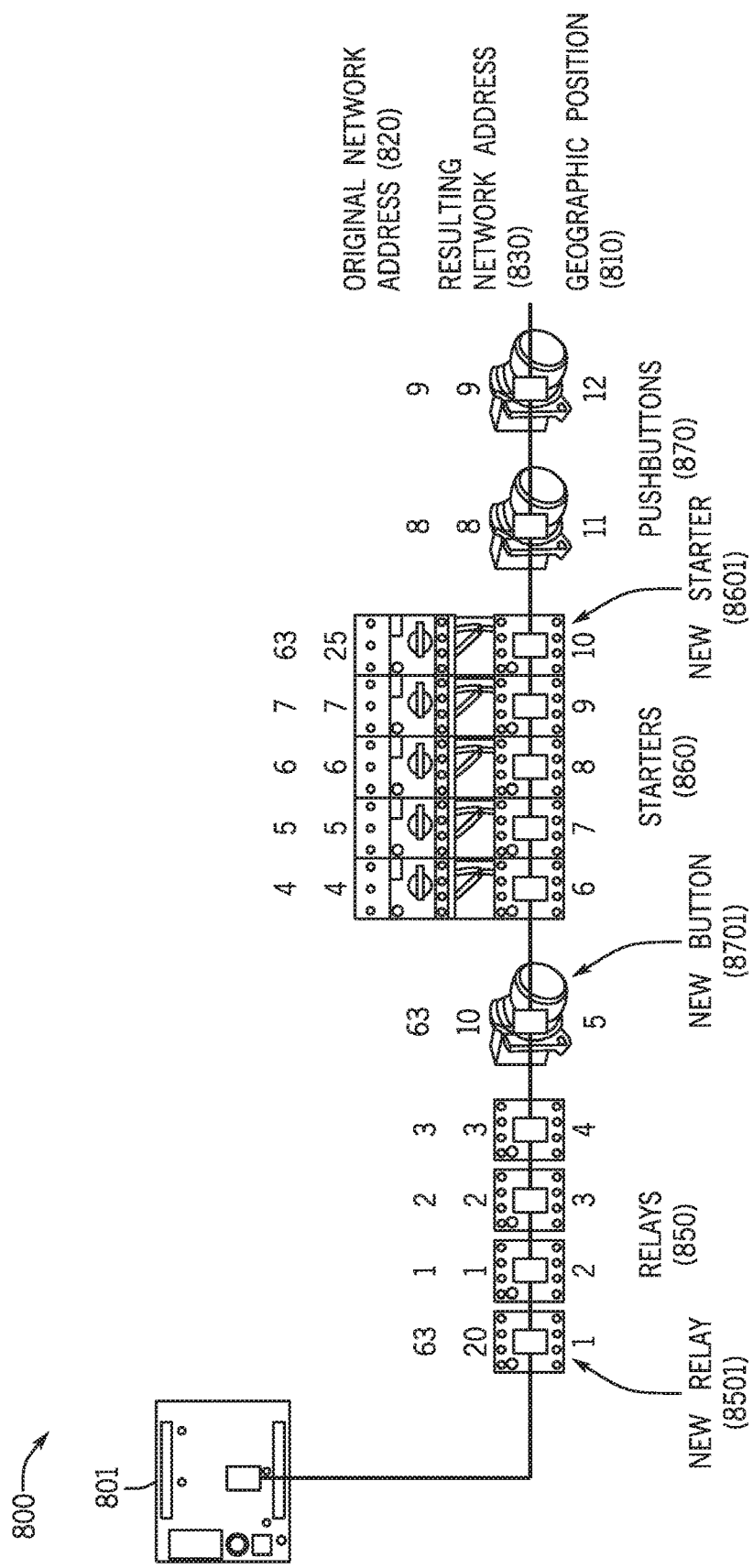
FIG. 8 illustrates an example implementation of determining and assigning network addresses for network devices based on the manual node commissioning addressing mode.

FIG. 8 illustrates an example implementation of determining and assigning network addresses for network devices based on the manual node commissioning addressing mode 800. FIG. 8 shows the same linear network as shown in FIG. 4. According to the manual node commissioning address mode, the network address may be any possible unique addresses. In FIG. 8, the three newly added devices are a new relay 8501, a new starter 8601 and a new pushbutton 8701. As shown in FIG. 8, they are assigned the network addresses 20, 25 and 10. It is noted that the network addresses 20, 25 and 10 are all unique to the linear network, and they are all under the network address upper limit of 63 and they are not assigned to other existing network devices.

In FIGS. 4-8, a network apparatus is shown (401 in FIG. 4, 501 in FIG. 5, 601 in FIG. 6, 701 in FIGS. 7 and 801 in FIG. 8). The network apparatus may have a network address zero (0). The network apparatus may be a network gateway, a network router or a control workstation or a network commissioning tool. Alternately, some functions of the network apparatus may reside in a gateway/router while other functions may reside in a control workstation or network commissioning tool. The network apparatus may have a user interface. A network designer may use the user interface to select the node commissioning mode and/or enter the network address for the network device. The network address entered may be for a newly added device on the network. Or, alternatively, the entered network address may be used to replace an existing network address for one or multiple network devices. The system designer may use the user interface to enter the network address for any devices on the network.

Figure 9:
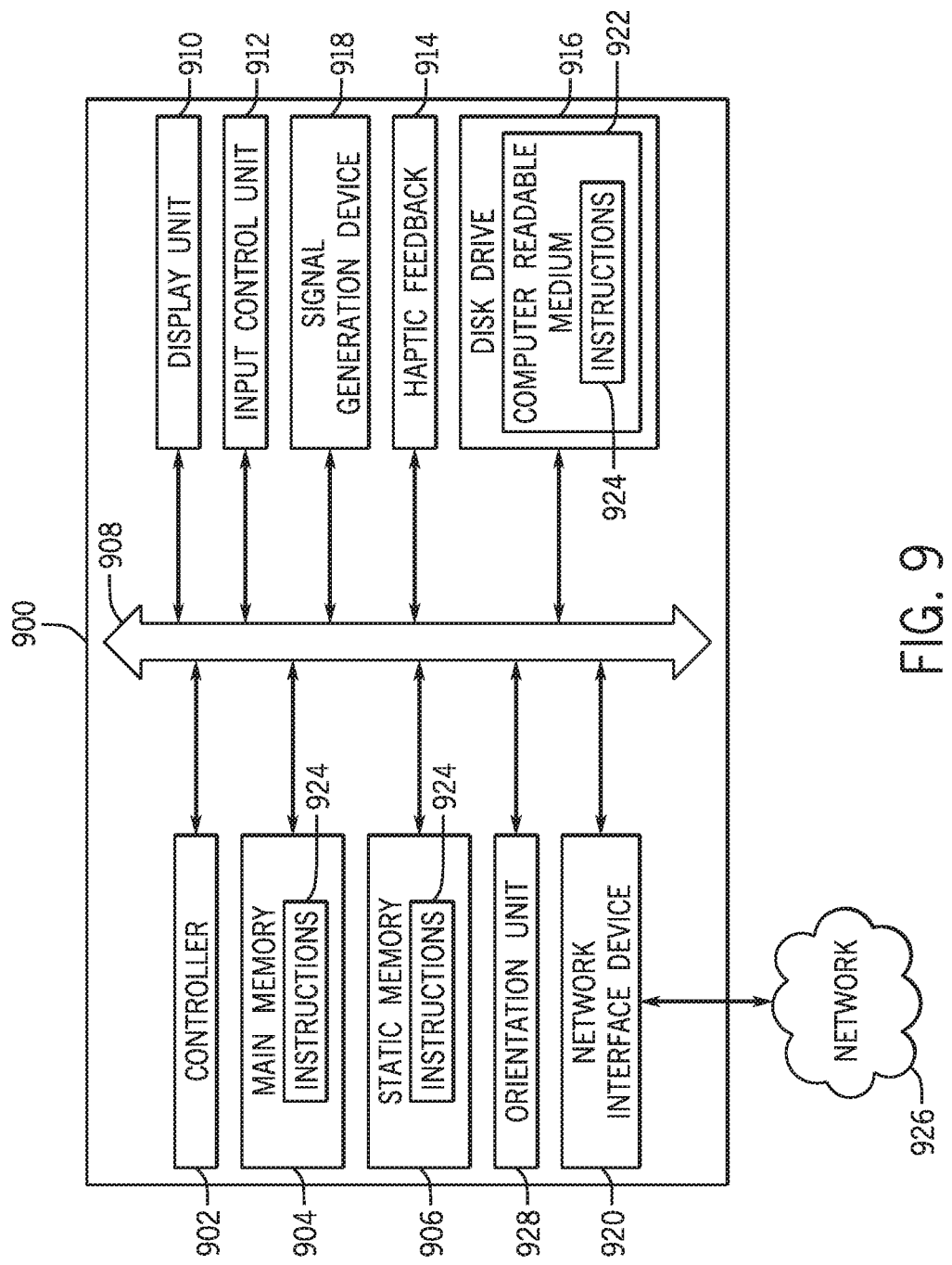
FIG. 9 illustrates an example of a computer system that may be used for supporting multiple network addressing modes.

FIG. 9 illustrates an example of a computer system that may be used for multiple network addressing modes. Referring to FIG. 9, an illustrative embodiment of a computer system that may be used for one or more of the components illustrated by the method, network apparatus and system in FIGS. 1-3, or in any other system configured to carry out the methods discussed in this disclosure herein, is shown and is designated 900. Although the computer system 900 is illustrated in FIG. 9 as including all of the components as illustrated, it is within the scope of this innovation for the computing system to be comprised of fewer, or more, components than just illustrated in FIG. 9.

The computer system 900 can include a set of instructions 924 that can be executed to cause the computer system 900 to perform any one or more of the methods, processes or computer-based functions disclosed herein. For example, the address mode determiner as described herein may be a program comprised of a set of instructions 924 that are executed by the controller 902 to perform any one or more of the methods, processes or computer-based functions described herein. Such a program may be stored in whole, or in any combination of parts, on one or more of the exemplary memory components illustrated in FIG. 9, such as the main memory 904, static memory 906, or disk drive 916.

As described, the computer system 900 may be mobile device. The computer system 900 may also be connected using a network 918, to other computer systems or peripheral devices. In a networked deployment, the computer system 900 may operate in the capacity of a server or as a client user computer in a server-client user network environment, or as a peer computer system in a peer-to-peer (or distributed) network environment.

In addition to embodiments in which the computer system 900 is implemented, the computer system 900 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a controller 902, such as a central processing unit ("CPU"), a graphics processing unit ("GPU"), or both. Moreover, the computer system 900 can include a main memory 904, and additionally may include a static memory 906. In embodiments where more than one memory components are included in the computer system 900, the memory components can communicate with each other via a bus 908. As shown, the computer system 900 may further include a display unit 910, such as a liquid crystal display ("LCD"), an organic light emitting diode ("OLED"), a flat panel display, a solid state display, or a cathode ray tube ("CRT"). Additionally, the computer system 900 may include one or more input devices 912, such as a keyboard, push button(s), scroll wheel, digital camera for image capture and/or visual command recognition, touch screen, touchpad or audio input device (e.g., microphone). The computer system 900 can also include signal outputting components such as a haptic feedback component 914 and a signal generation device 918 that may include a speaker or remote control.

Although not specifically illustrated, the computer system 900 may additionally include a GPS (Global Positioning System) component for identifying a location of the computer system 900. Additionally, the computer system 900 may include an orientation unit 928 that includes any combination of one or more gyroscope(s) and accelerometer(s).

The computer system 900 may also include a network interface device 920 to allow the computer system 900 to communicate via wireless, or wired, communication channels with other devices. The network interface device 920 may be an interface for communicating with another computer system via a Wi-Fi connection, Bluetooth connection, Near Frequency Communication connection, telecommunications connection, internet connection, wired Ethernet connection, or the like. The computer system 900 may also optionally include a disk drive unit 96 for accepting a computer readable medium 922. The computer readable medium 922 may include a set of instructions that are executable by the controller 902, and/or the computer readable medium 922 may be utilized by the computer system 900 as additional memory storage.

In a particular embodiment, as depicted in FIG. 9, the disk drive unit 916 may include a computer-readable medium 922 in which one or more sets of instructions 924, such as software, can be embedded. Further, the instructions 924 may embody one or more of the methods, processes, or logic as described herein. In a particular embodiment, the instructions 924 may reside completely, or at least partially, within the main memory 904, the static memory 906, and/or within the controller 902 during execution by the computer system 900. The main memory 904 and the controller 902 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 900 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 922 that includes instructions 924 or receives and executes instructions 924 responsive to a propagated signal; so that a device connected to a network 918 can communicate voice, video or data over the network 918. Further, the instructions 924 may be transmitted or received over the network 918 via the network interface device 920.

While the computer-readable medium 924 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 922 can include a solid-state memory such as a memory card or other package that houses one or more non-volatile read-only memories, such as flash memory. Further, the computer-readable medium 922 can be a random access memory or other volatile re-writable memory. Additionally, the computer-readable medium 922 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 922 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by network companies and broader resources and utilities institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the invention. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the invention.

Although the above discussion discloses various exemplary embodiments of the invention, it should be apparent that those skilled in the art can make various modifications that will achieve some of the advantages of the invention without departing from the true scope of the invention.

We claim:

1. A method of determining and assigning node addresses for network devices in a non-IP based network based on selecting and using one of multiple network addressing modes, comprising:

using a network apparatus having a network address mode selector, selecting between addressing modes including an automap full mode, an automap-by-type full mode, an automap light mode, an automap-by-type light mode and a manual node commissioning mode for determining and assigning the node addresses for the network devices;

in response to selecting the automap full mode, determining and assigning the node addresses for the network devices according to relative geographical locations of the network devices in the non-IP based network, wherein the node addresses follow a network address sequence, and are determined and assigned automatically;

in response to selecting the automap-by-type full mode, determining and assigning the node addresses for the network devices according to the relative geographical locations of the network devices in the non-IP based network within device type specific address ranges, wherein the node addresses follow the network address sequence within the appropriate device type specific address ranges, and are determined and assigned automatically;

in response to selecting the automap light mode, determining and assigning the node addresses for newly added network devices to an existing non-IP based network according to geographical locations of the added network devices in the non-IP based network, wherein the added network devices are addressed to follow the network address sequence starting with a next available address in an original network address geography;

in response to selecting the automap-by-type light mode, determining and assigning the node addresses for the newly added network devices to the existing non-IP based network according to the geographical locations of the added network devices in the non-IP based network within the device type specific address ranges, wherein the added network devices are addressed to follow the network address sequence starting with the next available address within the appropriate device type specific address ranges in the original network address geography; and in response to selecting the manual node commissioning mode, determining and assigning the node addresses for the network devices based on the manual node commissioning mode, wherein the node address for each network device is uniquely and individually determined and assigned.

2. The method of claim 1, further comprising automatically addressing each of the network devices in the non-IP based network.

3. The method of claim 2, wherein each of the network devices is addressed sequentially.

4. The method of claim 2, wherein each of the network devices is addressed sequentially within an appropriate device type specific address range.

5. The method of claim 1, wherein determining and assigning the node addresses for the newly added network devices based on the automap light mode further comprising assigning the node addresses sequentially starting with a next available unused address in the original network address geography.

6. The method of claim 1, wherein determining and assigning the node addresses for the newly added network devices based on the automap-by-type light mode further comprising assigning the node addresses sequentially within a device type specific address range starting with a next available unused address in the original network address geography.

7. The method of claim 1, wherein determining and assigning the node address for the network devices is performed manually by a system designer.

8. The method of claim 1, wherein the unique node addresses have an upper limit, wherein the upper limit is set based on the non-IP based network.

9. The method of claim 1, wherein the unique node addresses are determined and assigned according to a type of network device, or a function of a device within a complex machine, wherein each unique node address is set by a system designer before it is connected to the non-IP based network.

10. A network apparatus comprising: a processor and non-transitory computer readable medium storing processing instructions for determining and assigning node addresses for network devices in a non-IP based network based on multiple network addressing modes, wherein the processing instructions, when executed by the processor, cause the processor to:

in response to using a mode selector, select between addressing modes including an automap full mode, an automap-by-type full mode, an automap light mode, an automap-by-type light mode and a manual node commissioning mode for determining and assigning the node addresses for the network devices, in response to selecting the automap full mode, determine and assign the node addresses for the network devices according to relative geographical locations of the network devices in the non-IP based network, wherein the node addresses follow a network address sequence, and are assigned automatically, in response to selecting the automap-by-type full mode, determine and assign the node addresses for the network devices according to the relative geographical locations of the network devices in the non-IP based network within device type specific address ranges, wherein the node addresses follow the network address sequence within the appropriate device type specific address ranges, and are determined and assigned automatically, in response to selecting the automap light mode, determine and assign the node addresses for newly added network devices to an existing non-IP based network according to geographical locations of the newly added network devices in the non-IP based network, wherein the added network devices are addressed to follow a network address sequence starting with a next available address in an original network address geography, in response to selecting the automap-by-type light mode, determine and assign the node addresses for the newly added network devices to the existing non-IP based network according to the geographical locations of the added network devices in the non-IP based network within device type specific address ranges, wherein the added network devices are addressed to follow the network address sequence starting with the next available address within the appropriate device type specific address ranges in the original network address geography, and in response to selecting the manual node commissioning mode, determine and assign the node addresses for the network devices, wherein the node address for each network device is uniquely and individually determined and assigned.

11. The network apparatus of claim 10, wherein the processing instructions further cause the processor to automatically address each of the network devices in the non-IP based network.

12. The network apparatus of claim 11, wherein each of the network devices is addressed sequentially.

13. The network apparatus of claim 11, wherein each of the network devices is addressed sequentially within an appropriate device type specific address range.

14. The network apparatus of claim 10, wherein the processing instructions that cause the processor to determine and assign the node addresses for the newly added network devices to the existing non-IP based network based on the automap light mode further cause the processor to assign the node addresses sequentially starting with a next available unused address in the original network address geography.

15. The network apparatus of claim 10, wherein the processing instructions that cause the processor to determine and assign the node addresses for the newly added network devices, based on the automap-by-type light mode, further cause the processor to assign the node addresses sequentially within a device type specific address range starting with a next available unused address in the original network address geography.

16. A system comprising:
a non-IP based network having network devices;
a set of network devices to be added to the non-IP based network; and
a network apparatus having a processor and non-transitory computer readable medium storing processing instructions for determining and assigning node addresses for the network devices in the non-IP based network based on multiple network addressing modes, wherein the processing instructions comprise:

a mode selector to select between addressing modes including an automap full mode, an automap-by-type full mode, an automap light mode, an automap-by-type light mode and a manual node commissioning mode for determining or selecting the node address for the added network devices;

an automap full mode address determiner, in response to selecting the automap full mode, to determine the node addresses for the network devices according to relative geographical locations of the network devices in the non-IP based network, wherein the node addresses follow a network address sequence;

an automap-by-type full mode address determiner, in response to selecting the automap-by-type full mode, to determine the node addresses for the network devices according to the relative geographical locations of the network devices in the non-IP based network within device type specific address ranges, wherein the node addresses follow the network address sequence within the appropriate device type specific address ranges;

an automap light mode address determiner, in response to selecting the automap light mode, to determine the node addresses for a set of newly added network devices to an existing non-IP based network according to geographical locations of the added network devices in the non-IP based network, wherein the added network devices are addressed to follow a network address sequence starting with a next available address in an original network address geography;

an automap-by-type light mode address determiner, in response to selecting the automap-by-type light mode, to determine the node addresses for the set of newly added network devices to the existing non-IP based network according to the geographical locations of the added network devices in the non-IP based network within device type specific address ranges, wherein the added network devices are addressed to follow the network address sequence starting with the next available address within the appropriate device type specific address ranges in the original network address geography;

a manual node commissioning mode address selector, in response to selecting the manual node commissioning mode, to select the node address for network devices, wherein the node address for each network device is uniquely and individually determined; and a node address assigner to assign the device addresses based one the determined or selected node addresses for the network devices by the selected mode from the mode selector.

17. The system of claim 16, wherein the processing instructions comprise an automatic addressor to automatically address each of the network devices in the non-IP based network, wherein each of the network devices is addressed sequentially.

18. The system of claim 16, wherein the manual node commissioning mode allows a system designer to input the node addresses via a user interface.

19. The system of claim 16, wherein the input node addresses are the determined node addresses by the selected mode from the mode selector.

20. The system of claim 18, wherein the network apparatus is not addressed in the non-IP based network.

* * * * *